US012680882B2

(12) United States Patent
Brown et al.

(10) Patent No.: US 12,680,882 B2
(45) Date of Patent: Jul. 14, 2026

(54) DETECTION OF DAMAGED IR SENSOR ARRAY

(71) Applicant: Haier US Appliance Solutions, Inc., Wilmington, DE (US)

(72) Inventors: Richard Brown, Louisville, KY (US); Eugenio Gomez, Louisville, KY (US); Aaron Zarate, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 104 days.

(21) Appl. No.: 18/604,029

(22) Filed: Mar. 13, 2024

(65) Prior Publication Data

US 2025/0290803 A1 Sep. 18, 2025

(51) Int. Cl.
| | |
|---|---|
| G01J 5/90 | (2022.01) |
| F24C 7/08 | (2006.01) |
| G01J 5/04 | (2006.01) |
| G01J 5/06 | (2022.01) |
| G01J 5/10 | (2006.01) |

(52) U.S. Cl.
CPC ............... G01J 5/90 (2022.01); F24C 7/082 (2013.01); F24C 7/083 (2013.01); F24C 7/087 (2013.01); G01J 5/042 (2013.01); *G01J 2005/065* (2013.01); *G01J 2005/106* (2013.01)

(58) Field of Classification Search
CPC .. G01J 5/90; G01J 2005/065; G01J 2005/106; F24C 7/082; F24C 7/087; F24C 7/083
See application file for complete search history.

(56) References Cited

U.S. PATENT DOCUMENTS

| | | | | |
|---|---|---|---|---|
| 6,538,238 B1* | 3/2003 | Berkcan | ................. | H05B 3/746 |
| | | | | 219/501 |
| 9,055,615 B2 | 6/2015 | Watanabe et al. | | |
| 2017/0152697 A1* | 6/2017 | Dehelean | ............... | E05F 15/73 |
| 2021/0068204 A1* | 3/2021 | Park | .................. | G01R 19/1659 |
| 2021/0096029 A1* | 4/2021 | Varga | ........................ | G01J 5/06 |
| 2022/0366869 A1* | 11/2022 | Kim | ......................... | G06F 3/017 |
| 2023/0079379 A1* | 3/2023 | Recio | ..................... | G01K 1/146 |
| | | | | 219/627 |
| 2023/0160751 A1* | 5/2023 | Simolon | ............... | H04N 25/78 |
| | | | | 374/121 |
| 2024/0192059 A1* | 6/2024 | Baumgartner | .......... | G01J 5/046 |

FOREIGN PATENT DOCUMENTS

| | | |
|---|---|---|
| CA | 1263684 A | 12/1989 |
| EP | 1978785 B1 | 6/2013 |

* cited by examiner

*Primary Examiner* — Georgia Y Epps
*Assistant Examiner* — Erin R Garber
(74) *Attorney, Agent, or Firm* — Dority & Manning, P.A.

(57) ABSTRACT

A cooktop appliance includes a cooking panel comprising a heating zone, an infrared (IR) sensor array positioned below the heating zone, the IR sensor array comprising a shielded IR sensor and an IR source, and a controller operatively coupled to the shielded IR sensor and the IR source. The controller is configured to receive a first signal from the shielded IR sensor, energize the IR source to illuminate a pan in the heating zone, receive a second signal from the shielded IR sensor, identify a fault in the IR sensor array based on a comparison between the first signal and the second signal, and generate a fault signal in response to identifying the fault in the IR sensor array.

18 Claims, 3 Drawing Sheets

200

PERFORM A DARK READING
ON A SHIELDED IR SENSOR — 202

ENERGIZE AN IR SOURCE — 204

PERFORM A LIT READING
ON THE SHIELDED IR SOURCE — 206

COMPARE THE DARK READING
WITH THE LIT READING — 208

SIGNAL A FAULT IF THE COMPUTED DIFFERENCE BETWEEN
THE DARK SIGNAL AND THE LIT SIGNAL IS GREATER THAN
A PREDETERMINED VALUE — 210

DETECTION OF DAMAGED IR SENSOR ARRAY

FIELD OF THE INVENTION

The present disclosure relates generally to cooktops, in particular to cooktops with pan temperature measurement systems.

BACKGROUND OF THE INVENTION

Certain cooktop appliances may include a glass or ceramic-glass cooking panel for supporting cooking utensils such as pots, pans, and other containers (collectively herein, "cookware") with food items therein. A heating zone defined on the cooking panel may have a heating element, such as an electric heating element, positioned below the heating zone to heat the pan supported in the heating zone. In some cases, it may be desirable to measure the actual temperature of the pan, for example during a pre-heat period or during a cooking process, such as a closed-loop cooking process.

Measurement of pan temperature may be accomplished with an infrared (IR) sensor array mounted below the glass top of the cooking appliance. As the pan heats, it emits IR radiation that can be transmitted through the glass cooking panel. The IR emissions from the pan can be received by the sensor, correlated to a pan temperature, and processed and/or displayed to the user. In many cases, the accuracy of IR sensors may be affected by the temperature of the sensors themselves, which is influenced by the heating element, the heated pan, and other nearby heat sources through conduction or convection. To more accurately read the temperature of a pan, the effect of the sensor temperature on the IR sensor reading must be accounted for.

A sensor in the sensor array that is not influenced by IR may be used to produce a signal corresponding to the temperature of the IR sensor. The reliability of such a system depends on monitoring the function of the IR-shielded temperature sensor to detect faults. To further ensure the accuracy of the readings, a repeatable procedure to determine the IR-neutral sensor remains unaffected by incident IR radiation may be beneficial.

Accordingly, an IR sensor array capable of determining an IR-neutral sensor remains undamaged and unaffected by IR radiation may be useful.

BRIEF DESCRIPTION OF THE INVENTION

Aspects and advantages of the invention will be set forth in part in the following description, may be apparent from the description, or may be learned through practice of the invention.

In one exemplary embodiment, a cooktop appliance is provided including a cooking panel comprising a heating zone, an infrared (IR) sensor array positioned below the heating zone, the IR sensor array comprising a shielded IR sensor and an IR source, and a controller operatively coupled to the shielded IR sensor and the IR source. The controller is configured to receive a first signal from the shielded IR sensor, energize the IR source to illuminate a pan in the heating zone, receive a second signal from the shielded IR sensor, identify a fault in the IR sensor array based on a comparison between the first signal and the second signal, and generate a fault signal in response to identifying the fault in the IR sensor array.

In another exemplary embodiment, a method of determining a damaged IR sensor array in a cooktop appliance is provided. The cooktop appliance includes a cooking panel comprising a heating zone, an IR sensor array comprising a shielded IR sensor, and an IR source. The method includes receiving a first signal from the shielded IR sensor, activating the IR source to illuminate a pan in the heating zone, receiving a second signal from the shielded IR sensor, identifying a fault in the IR sensor array based on a comparison between the first signal and the second signal, and generating a fault signal in response to identifying the fault in the IR sensor array.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
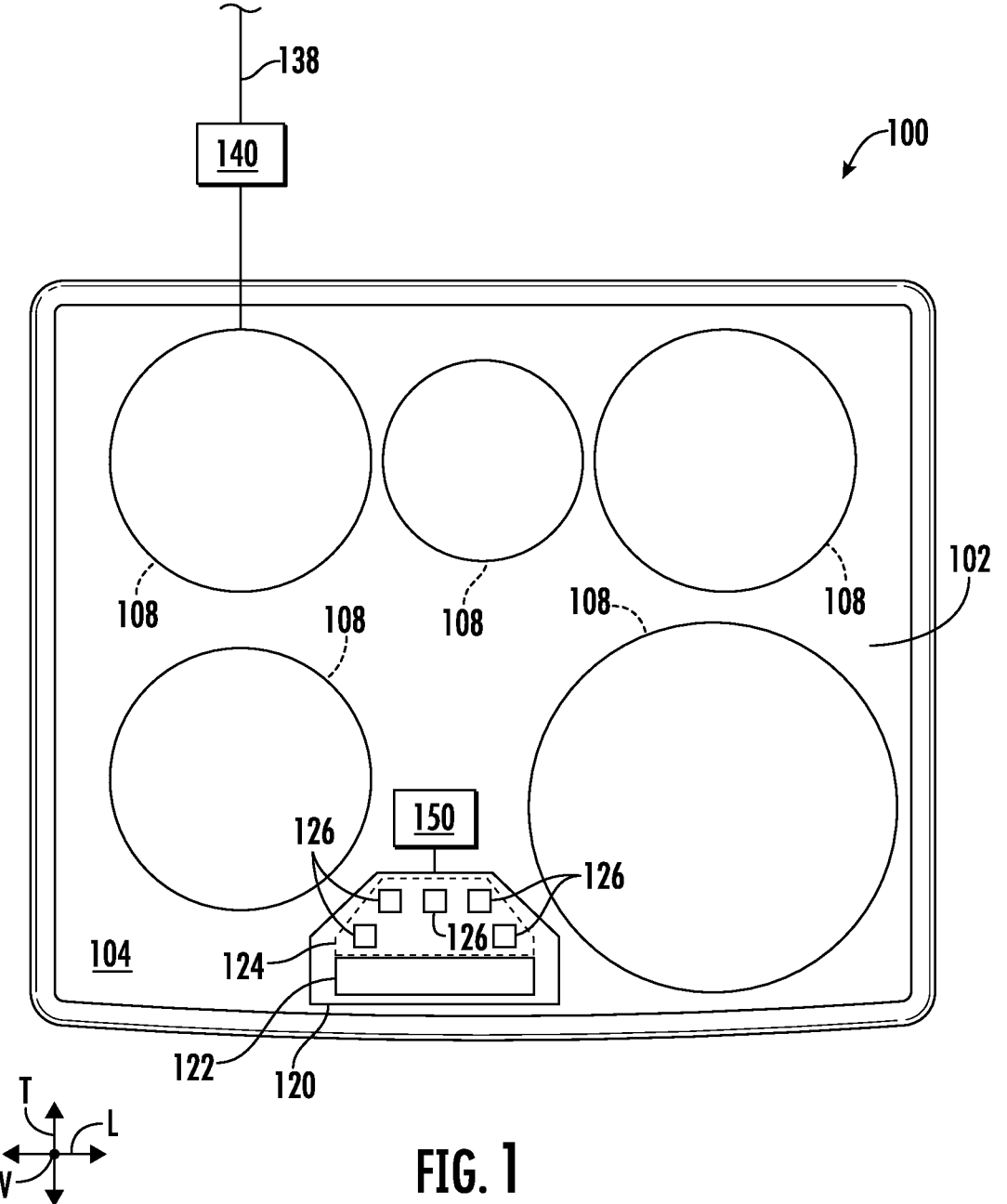
FIG. 1 provides a top perspective view of a cooktop appliance in accordance with an embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Embodiments of the present disclosure are directed to a cooktop appliance with a pan support surface supporting a bottom surface of a pan or cookware. As used herein, "pan," "cookware," and the like are intended to cover pots, frying pans, saucepans, skillets, woks, or other vessels or containers typically used to hold food items to be heated or cooked therein. Accordingly, "pan" or "cookware" is not intended to be limiting, but to be inclusive of all suitable containers.

Turning to the figures, FIG. 1 provides a top, plan view of a cooktop appliance 100 in accordance with exemplary embodiments of the present disclosure. Cooktop appliance 100 can be installed in various locations such as in cabinetry in a kitchen, with one or more ovens to form a range appliance, or as a standalone appliance. The cooktop 100 defines a vertical direction V, a lateral direction L, and a transverse direction T, with V, L, and T being mutually perpendicular.

Cooktop appliance 100 includes a cooktop plate or panel 102 for supporting cooking utensils, such as pots or pans, collectively pans, on a cooking or top surface 104 of panel 102. Cooktop panel 102 may alternately be referred to as a pan support surface throughout this disclosure. When assembled, top surface 104 is directed vertically upward to contact a pan, while a bottom interior surface (not shown) is directed vertically downward opposite the top surface 104. Cooktop panel 102 may be any suitable rigid plate, such as one formed of ceramic or glass (e.g., glass ceramic). Cooktop panel 102, may alternately be grids, grates, offsets, or other structures or features suitable for supporting a pan 106.

The cooktop panel includes and defines one or more heating zones, for example representative heating zones 108 at a top surface 104. Panel 102 may be continuous over heating zones 108. While shown with five heating zones 108 in the exemplary embodiment of FIG. 1, cooktop appliance 100 may include any number of heating zones 108 in alternative embodiments. Heating zones 108 can also have various shapes and sizes (e.g., multiple diameters illustrated in FIG. 1). For example, each heating zone 108 can have a different diameter, the same diameter, or any suitable combination of diameters. Location and distribution of the heating zones 108 in FIG. 1 is for illustration purposes only. Heating zones 108 may be provided in other layouts, distribution, configuration, or orientation in accordance with embodiments of this disclosure.

Figure 2:
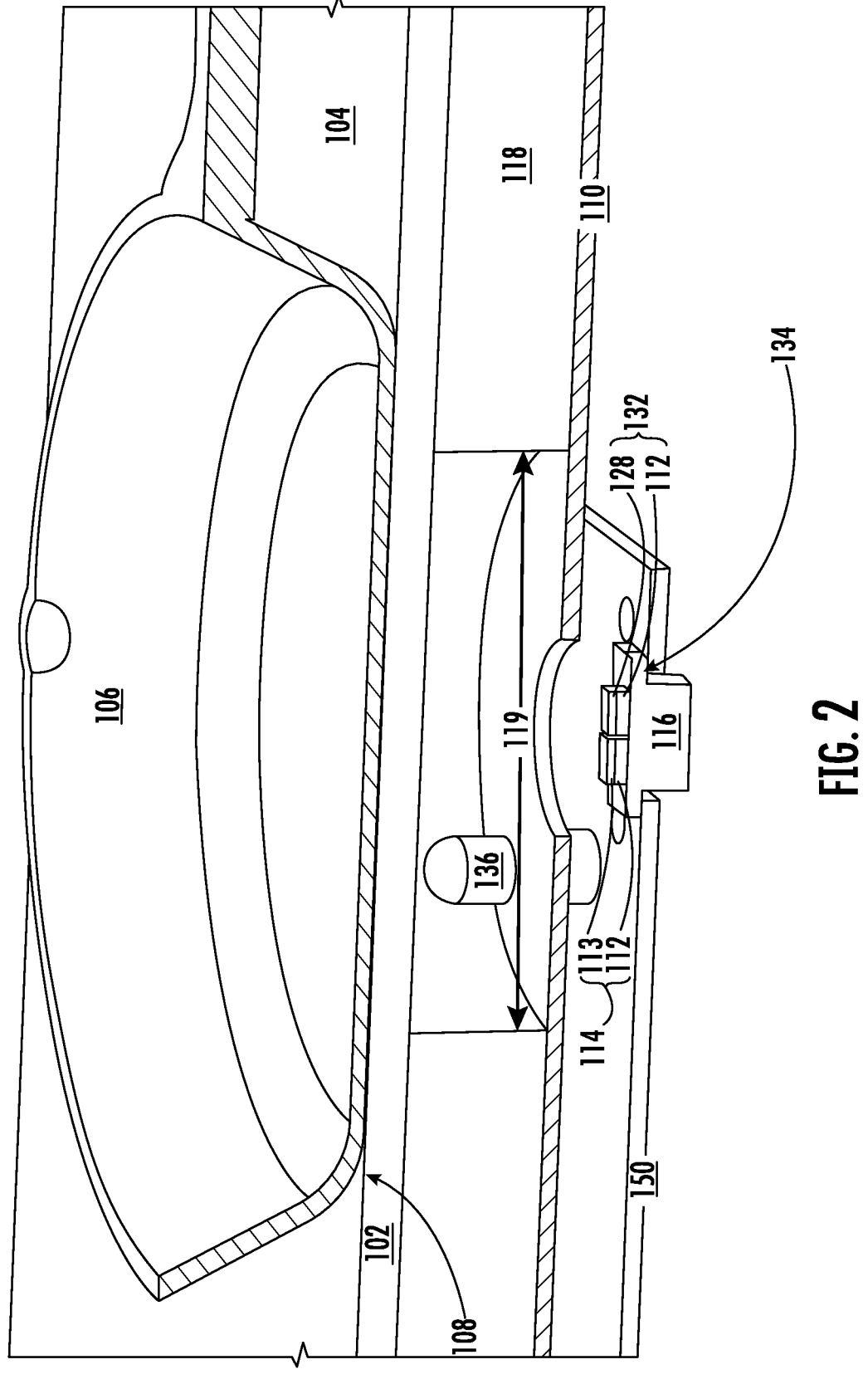
FIG. 2 provides a side sectional exploded view of a portion of a cooktop appliance in accordance with an embodiment of the present disclosure.

FIG. 2 represents a side sectional exploded view of a portion of the cooktop 102 including a pan 106 within a heating zone 108 and supported by the top surface 104. Generally, FIG. 2 presents the heating element 118, sensors, and associated structures generally found below the cooktop panel 102 in a representative cooktop appliance 100. In particular, a sensor array 134 comprising at least one filtered IR sensor 114, a shielded sensor 132 and an IR light source 136, is provided below the cooktop panel 102, vertically below the heating zone 108. At least the filtered IR sensor 114, the shielded sensor 132, and the IR light source 136 are operatively coupled to the controller 150. A heating element 118 is positioned between the sensor array 134 and the cooktop panel 102, aligned with the heating zone 108. The heating element 118 defines one or more passages 119 formed therethrough (one shown). At least the filtered IR sensor 114, the shielded IR sensor 132, and the IR light source 136 of sensor array 134 are aligned with passage 119 and positioned with a field of view that includes the pan 106 and cooktop panel 102 in the heating zone 108. In the illustrated embodiment of FIG. 2, a mounting plate 110 (e.g., which may act as a heat shield) is provided, positioned between the heating element 118 and the sensor array 134.

Referring to FIGS. 1 and 2, the heating elements 118 may be electrically powered heating elements, for example electrically powered induction heating elements. However, the present subject matter may be equally applicable to radiant, gas, induction, or other heating elements. Electrical power is provided to the heating elements 118, and controlled by controller 150 (e.g., or a separate dedicated controller or energy control device 140), as an electric voltage at a current sufficient to generate a desired power output (e.g., thermal or magnetic output) from the heating elements 118. For example, electric power may be provided to cooktop appliance 100, in particular to a heating element 118, via electrical conductor 138 which may be electrically connected to a suitable electric source, such as an electric utility supply or generator (not shown). Electrically coupled to the conductor 138 and functionally located between the electric source and the heating element 118 is energy control device 140 in operative communication with the controller 150. Energy control device 140 is in communication with one or more of the user input controls 126 (discussed below) and may selectively control the electrical power flowing to the heating element 118. The selective control of power to the heating element 118 may provide controlled energy output of the heating element 118.

Exemplary heating elements 118 may include one or more radiant heating elements, one or more inductance heating elements, or combinations of radiant and inductance heating elements. Other embodiments may include other types of electrically powered heating elements alone or in combination with those described above.

Referring back to FIG. 1, exemplary cooktop appliance 100 as illustrated includes a controller 150 operatively coupled to a user interface 120, a display panel 122, a control panel 124, and user input controls 126. User interface 120 may include a control portion, control panel 124 including user input controls 126, for example one user input control for each heating element 118. The user input controls 126 may accept and respond to a user's commands to control various aspects of the cooktop appliances 100. Input devices 126 may include one or more push buttons, rotating dials, or touch screens, or combinations thereof, suitable to enter instructions for the operation of aspects of the cooktop appliance 100. User interface 120 can be any type of input device and can have any configuration. In FIG. 1, user interface 120 is located within a portion of the cooktop appliances 100 in the T-L plane (i.e., generally horizontal). Alternatively, user interface 120 may be positioned at another location that is convenient for a user to access during operation of cooktop appliances 100.

Controller 150 may include memory (e.g., non-transitory media) and microprocessor, such as a general or special purpose microprocessor operable to execute programming instructions or micro-control code associated with an operation of the cooktop appliance 100. The memory may represent random access memory such as DRAM, or read only memory such as ROM or flash. In one embodiment, the processor executes programming instructions stored in memory. The memory may be a separate component from the processor or may be included onboard within the processor. Alternatively, controller 150 may be constructed without using a microprocessor (e.g., using a combination of discrete analog or digital logic circuitry, such as switches, amplifiers, integrators, comparators, flip-flops, AND gates, and the like) to perform control functionality instead of relying upon software. Heating elements 118, user interface 120, and other components of cooktop appliance 100 are in operative communication with controller 150 via one or more signal lines or shared communication busses. User input, through user input controls 126, is communicated to the controller 150 for processing and further instructions to other components.

User interface 120 may include a display panel 122 to display visual information to a user regarding the operation of cooktop appliances 100. For example, a display panel 122 can include a graphical representation of each of the heating elements 118, a selected cooking temperature, status, or other options. According to embodiments of the present disclosure, a user may manipulate the user input controls 126 to select a closed-loop cooking mode in which the cooktop appliance 100 operates to maintain a predetermined or preselected pan temperature. When a closed-loop feature is activated in a cooktop appliance, a target pan temperature is selected. The cooktop 100, through a closed-loop feedback system including the sensor array 134, senses the temperature of the pan 106, communicates the sensed temperature as a signal to the controller 150. For example, the controller 150 is operatively coupled to filtered IR sensor 114, shielded IR sensor 132, and IR source 136. In the illustrated embodiment, the sensor array 134 detects, or senses, IR radiated by the pan which corresponds to the pan temperature. The corresponding signals are communicated to the controller 150 for processing, for example to a corresponding temperature signal. The sensed pan temperature is compared to the preselected pan temperature, and the controller, in operative communication with the energy control device 140, adjusts the energy supplied to the heating element 118.

As illustrated in FIG. 2, an embodiment of the filtered IR sensor 114 comprises a photosensitive detector 112, for example a lead sulfide (PbS) photodetector, and may include an optical filter 113. Optical filters may be used to filter out some wavelengths of electromagnetic radiation, for example certain wavelengths in the IR spectrum corresponding to specific temperatures or temperature ranges. Shielded IR sensor 132 comprises a similar photosensitive detector 112 and an optical filter. For example, optical filter may be an IR mirror 128 (e.g., a gold mirror) positioned over photosensitive detector 112 for filtering out at least all IR wavelengths. In this regard, IR mirror 128 may be an IR mirror that is impenetrable by IR radiation and protects the shielded IR sensor from detecting (or "seeing") any IR radiation, i.e., protecting photosensitive detector 112 from receiving any IR radiation. It should be appreciated that photosensitive detector 112 may also be shielded on its sides and bottom, e.g., so the only way any light can get to them is through the IR mirror 128. For example, black glue or other shielding means may be used. Other suitable IR mirrors or shields are possible and within the scope of the present subject matter. Photosensitive detector 112 of shielded IR sensor 132 functions in the same manner, or substantially the same manner, as the photosensitive detector 112 in the filtered IR sensor 114.

When the cooktop appliance 100 is operated in a heating mode, thermal energy is applied to a pan 106 in the heating zone 108 (or a magnetic field in the case of an induction heating element). In embodiments, a heating element 118, for example an inductive heating element, is energized under the operation of the controller. The heating element 118 increases the temperature of the pan 106 as is known in the art. The pan 106 emits IR radiation corresponding to its temperature, with the emitted IR radiation incident upon the filtered IR sensor 114 and the shielded IR sensor 132. The photosensitive sensor 112 in the filtered IR sensor 114 produces a signal in response to the IR radiation received through the optical filter 113. The signal corresponding to the temperature of the pan 106 may be used by the controller 150 in operating the cooktop appliance 100. For example, when operating in accordance with a closed-loop heating process, the temperature signal is used to vary the energy supplied to the heating element 118, thus maintaining the pan temperature at a predetermined temperature or within a predetermined range.

In some cases, IR sensors 114, 132 may be sensitive to their actual temperature. In operation, the heating element 118 may heat the active and shielded IR sensors 114, 132 through conduction or convection. Some sensor arrays, for example the exemplary sensor array 134, include a cooler, such as thermoelectric cooler 116, to maintain the sensor array 134 at a constant temperature. In some cases, the thermoelectric cooler 116 is insufficient to maintain the sensor array 134 at a predetermined operating temperature or within a predetermined temperature range. According to example embodiments, one or more interface materials or layers may be positioned between thermoelectric cooler 116 and shielded IR sensors 114, 132, e.g., to ensure the temperature is even and consistent. Accordingly, the active and shielded IR sensors 114, 132 may produce a signal in response to their physical temperature. This temperature signal may vary with the actual sensor temperature and may not be proportional to the temperature of the cookware.

The total signal from the photosensitive sensor 112 in the filtered IR sensor 114 comprises a component in response to the incident IR radiation and a component in response to the temperature of the sensor. Without other inputs, the signal in response to the IR radiation incident upon active sensor 114 cannot be isolated from the signal in response to the actual sensor temperature. Accurately determining the temperature of the pan 106 may be facilitated by removing the signal corresponding to the influence of sensor temperature from the total signal from active sensor 114.

The shielded IR sensor 132, with an intact IR mirror 128, is impenetrable to IR radiation, and therefore unaffected by IR incident on the shielded sensor 132. The shielded IR sensor is, accordingly, responsive only to the temperature of the sensor array 134 in general, and the temperature of the shielded sensor in particular, when the IR mirror 128 is intact. The photosensitive detector 112 of shielded IR sensor 132 responds to the sensor's temperature in the same, or substantially the same, manner as the photosensitive detector 112 of the filtered IR sensor 114. Thus, the signal from the shielded IR sensor 132 due to the sensor's temperature (i.e., temperature-induced signal), can be used to remove the effect of the sensor temperature from the total signal of the filtered IR sensor 114. For example, the active and shielded IR sensors 114, 132 are in operative communication with the controller 150. Controller 150 (or any other suitable dedicated processor or computing element) includes instructions or an algorithm configured to modify the total signal from the filtered IR sensor 114 with the temperature-induced signal from the shielded IR sensor 132. The resultant signal corresponds to the filtered IR sensor's 114 response to the IR radiation from pan 106. By processing the total signal and the temperature-induced signal, the controller 150 effectively isolates the signal in response to the incident IR radiation. The controller 150 then determines the pan temperature from the IR induced signal.

The processing of the total signal and temperature-induced signal to isolate the IR response of the filtered IR sensor 114 may be negatively impacted if the IR mirror 128 is defective or damaged allowing some IR radiation to influence the temperature-induced signal (i.e., the shielded IR sensor signal). In the illustrated embodiment, sensor array 134 comprises an IR light source 136 used to evaluate the integrity (or shielding ability) of the IR mirror 128. The controller 150 periodically energizes the IR light source 136 to illuminate the bottom of pan 106 with a known wavelength or range of wavelengths of emitted IR radiation. In an embodiment, the IR source produces full spectrum IR radiation (i.e., from about 750 nanometers (nm) to about 1000 micrometers (μm)). Other embodiments may use a portion of the full spectrum of wavelengths. The IR light source 136 is positioned such that emitted light is directed to the heating zone 108. In an embodiment, there is no, or substantially no, emitted IR light directly incident upon the active or shielded IR sensors 114, 132. For example, in an embodiment, the body of the IR light source 136 extends vertically above the IR sensor (i.e., is closer to the pan than the optical filters 113 and IR mirror 128) such that the shielded IR sensor is protected or shielded from direct IR emitted from the IR light source 136. In an embodiment, the IR light source 136 includes an optical wave guide (not shown) to restrict transmission of IR radiation in a direction towards the heating zone 108.

The reflected IR light is incident upon the filtered IR sensor 114 and the shielded IR sensor 132. The controller receives a signal from the shielded IR sensor 132 when the IR light source 136 is de-energized (a "dark" measurement)

and a second signal when IR light source 136 is energized (a "lit" measurement). The controller 150 compares the dark and lit measurements to evaluate the integrity of the IR mirror 128 and the side shielding (e.g., black glue, etc.). If the shield 130 is intact, the signals from the dark measurement and the lit measurement at the shielded IR sensor will be substantially the same, or within a predetermined range attributable to signal "noise." The signal at the shielded IR sensor corresponds to the temperature-induced response of the shielded IR sensor.

If the integrity of the IR mirror 128 is compromised (i.e., not intact) due to defect or damage, the shielded IR sensor will detect the reflected IR light from the IR source. In such a case, the controller 150 receives a lit measurement from the shielded IR sensor 132 that differs from the dark measurement by more than the predetermined range of signal noise. In an embodiment, the controller 150 computes a difference, for example the controller performs an absolute value function yielding an absolute difference, between the lit and dark measurements from the shielded IR sensor 132 in determining the integrity of the IR mirror 128. The computed difference in excess of the predetermined range triggers a fault signal or error signal from the controller 150. The fault may be displayed at the user interface 120, for example at the display panel 122, or otherwise communicated to a user. In an embodiment, a generated fault signal of the shielded IR sensor 132 causes the suspension of certain heating features of the cooktop appliance 100. For example, a generated fault of shielded IR sensor would suspend a closed-loop heating feature. Any other feature that relies on the accurate determination of the pan temperature would also be suspended. Correcting the fault, for example by replacing the faulty shielded IR sensor 132, may reset the indicator and allow the suspended features to resume.

Figure 3:
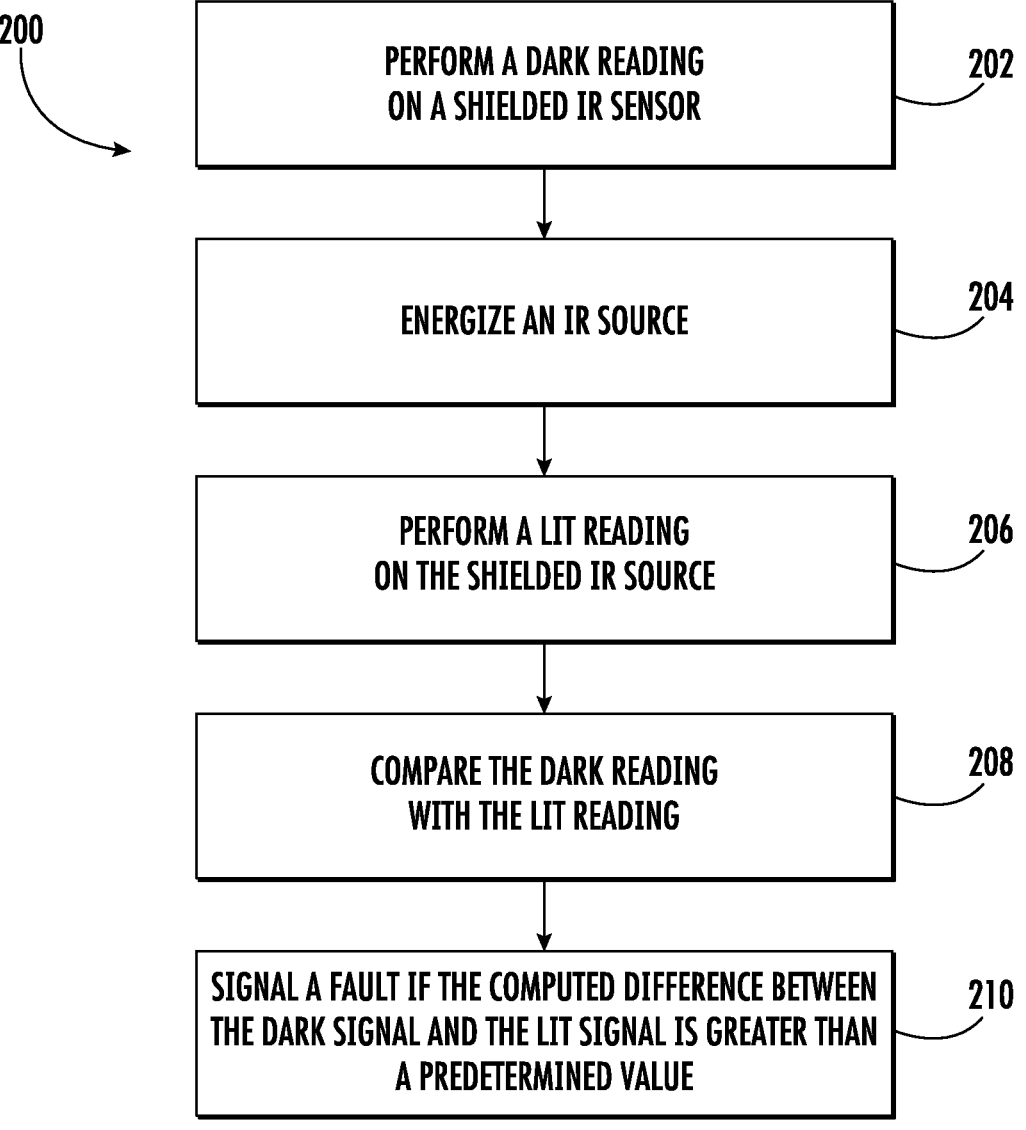
FIG. 3 illustrates a method of operation for a cooktop appliance in accordance with an embodiment of the present disclosure.

Now that the construction of a cooktop appliance in accordance with this disclosure has been presented, an exemplary method 200 of operation for user adjustable pan temperature offset for closed loop cooking will be described with reference to FIG. 3. Method 200 begins at 202 with performing a dark reading, that is the controller 150 receives a signal from the shielded IR sensor with the IR source de-energized (i.e., "dark"). Under the condition of an intact and impenetrable IR mirror 128, this first signal reading (or dark reading) would therefore represent the response of the shielded IR sensor to its own temperature (i.e., temperature-induced signal or reading). However, if the IR mirror 128 was compromised and IR radiation penetrated the shield 130, the first signal would include, as a component, a response to any incident IR radiation. In either case, the first signal reading is a baseline reading for evaluating the status of the IR mirror 128.

At 204, the controller 150 energizes the IR light source 136 to produce a known IR wavelength or range of wavelengths. The IR light source 136 is positioned such that the IR radiation emitted from the IR light source is directed to the heating zone 108. In an embodiment, all, or substantially all, of the emitted IR radiation is incident on the pan 106 supported in the heating zone 108, with no emitted IR radiation directly incident on the shielded IR sensor 132. The emitted IR radiation is reflected by the pan 106 and is incident upon the shielded IR sensor as reflected IR radiation. Reflected radiation may also be incident on other components of the sensor array 134, for example upon the filtered IR sensor 114. Notably, according to example embodiments, pan 106 need not be present on cooktop panel 102, e.g., as the glass of cooktop panel 102 also reflects IR radiation.

At 206, the controller 150 receives a second signal from the shielded IR sensor, that is, a signal with the IR source energized. This second signal is a "lit" signal or reading, as the IR source is illuminated. The first and second signals are received within a predetermined time period, for example within 5 seconds, or within 2 seconds, or within 0.5 seconds, e.g., long enough to allow the lamp to reach full brightness. As above, the IR source 136 emits IR radiation directed to a pan 106 supported in the heating zone 108. The pan 106 (or the glass of cooktop panel 102) reflects the IR radiation to at least the shielded IR sensor 132. In a situation in which the IR mirror 128 is intact and impenetrable, the reflected IR radiation from the IR source 136 will have no effect on the shielded IR sensor 132.

At 208, the controller 150 compares the readings and computes a difference, for example subtracts one signal from the other signal, or performs an absolute value difference, between the first, or dark, reading and the second, or lit, reading. In a situation in which the IR mirror is intact and impenetrable, the dark and lit readings will be substantially the same, and the computed difference will be within a range. If the computed difference is within a predetermined tolerance or less than a threshold value, the IR mirror is determined to be intact, and the heating process continues. Moreover, it should be appreciated that computing a difference is a non-limiting example of determining whether there is a significant difference between the two signals when they are expected to be the same. For example, a division operation could be performed, e.g., to generate a ratio that should be 1 or within a predetermined tolerance of 1. Any other suitable way of comparing the two signals could work to accomplish the same goal which is to see if we are getting a different signal when the lamp is ON versus OFF (e.g., such that the sensor temperature does not vary between the lit and dark reading).

At 210 a fault is signaled if the computed signal difference is greater than a predetermined tolerance or predetermined value. In a situation in which the dark (or baseline) reading and the lit readings differ by more than a predetermined range, the shielded IR sensor 132 has allowed IR radiation from the IR source 136 to reach the photosensitive detector 112. Accordingly, the IR mirror 128 is compromised and readings from the shielded IR sensor cannot be relied upon to reflect only the temperature-induced response of the active and shielded IR sensors 114, 132. The fault causes the controller to display an error message, for example at the display panel 122. The fault may also cause the controller to suspend certain heating modes or operations, for example closed-loop heating modes, until the fault is corrected.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A cooktop appliance defining a vertical direction, a lateral direction, and a transverse direction, each of which is mutually perpendicular, the cooktop appliance comprising:
   a cooking panel comprising a heating zone;

an infrared (IR) sensor array positioned below the heating zone, the IR sensor array comprising a shielded IR sensor and an IR source;
   a heating element positioned between the cooking panel and the IR sensor array, wherein the shielded IR sensor and the IR source are aligned with a passage through the heating element and positioned with a field of view of the pan in the heating zone; and
   a controller operatively coupled to the shielded IR sensor and the IR source, the controller configured to:
      receive a first signal from the shielded IR sensor;
      energize the IR source to illuminate a pan in the heating zone;
      receive a second signal from the shielded IR sensor;
      identify a fault in the IR sensor array based on a comparison between the first signal and the second signal; and
      generate a fault signal in response to identifying the fault in the IR sensor array.

2. The cooktop appliance of claim 1, wherein identifying the fault in the IR sensor array based on the comparison between the first signal and the second signal comprises:
   computing a signal difference between the first signal and the second signal; and
   determining that the signal difference is greater than a predetermined value.

3. The cooktop appliance of claim 2, wherein the signal difference is an absolute value of a difference between the first signal and the second signal or a ratio of the first signal and the second signal.

4. The cooktop appliance of claim 1, wherein:
   the first signal is a response to a temperature of the IR sensor array.

5. The cooktop appliance of claim 1, wherein the second signal is a response to IR emitted by the IR source that is reflected and a temperature of the IR sensor array.

6. The cooktop appliance of claim 1, wherein the shielded IR sensor is shielded from the IR source.

7. The cooktop appliance of claim 1, wherein the first signal and the second signal are received within a predetermined time period.

8. The cooktop appliance of claim 1, further comprising a closed-loop heating feature and a user interface, wherein the generated fault signal suspends the closed-loop heating feature.

9. The cooktop appliance of claim 1, further comprising a user interface, wherein the generated fault signal causes a display of an error signal on the user interface.

10. The cooktop appliance of claim 9, wherein the error signal indicates a damaged IR sensor array.

11. A method of determining a damaged IR sensor array in a cooktop appliance, the cooktop appliance comprising a cooking panel comprising a heating zone, an IR sensor array comprising a shielded IR sensor, an IR source, and a heating element positioned between the cooking panel and the IR sensor array, wherein the shielded IR sensor and the IR source are aligned with a passage through the heating element and positioned with a field of view of the pan in the heating zone, the method comprising:
   receiving a first signal from the shielded IR sensor;
   activating the IR source to illuminate a pan in the heating zone;
   receiving a second signal from the shielded IR sensor;
   identifying a fault in the IR sensor array based on a comparison between the first signal and the second signal; and generating a fault signal in response to identifying the fault in the IR sensor array.

12. The method of claim 11, wherein identifying the fault in the IR sensor array based on the comparison between the first signal and the second signal comprises:

computing a signal difference between the first signal and the second signal; and determining that the signal difference is greater than a predetermined value.

13. The method of claim 12, wherein computing the signal difference comprises performing an absolute value function on a difference between the first signal and the second signal.

14. The method of claim 11, wherein the first signal is a difference in resistance across the shielded IR sensor.

15. The method of claim 11, wherein the second signal is a difference in resistance across the shielded IR sensor.

16. The method of claim 11, wherein the shielded IR sensor is shielded from direct IR emitted from the IR source.

17. The method of claim 11, wherein receiving the first signal and the second signal occurs within a predetermined time period.

18. The method of claim 11, wherein the cooktop appliance further comprises a closed-loop heating feature and a user interface and the method further comprises:

suspending the closed-loop heating feature; and displaying an error message on the user interface, the error message corresponding to a damaged IR sensor array.

\* \* \* \* \*